(12) United States Patent
Toriumi

(10) Patent No.: US 7,641,563 B2
(45) Date of Patent: Jan. 5, 2010

(54) BOOT FOR CONSTANT-VELOCITY UNIVERSAL JOINT

(75) Inventor: Mayuki Toriumi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 247 days.

(21) Appl. No.: 11/723,429

(22) Filed: Mar. 20, 2007

(65) Prior Publication Data

US 2007/0225081 A1    Sep. 27, 2007

(30) Foreign Application Priority Data

Mar. 27, 2006    (JP)    ............... 2006-085657

(51) Int. Cl.
    *F16D 3/84*    (2006.01)
(52) U.S. Cl. .................................... 464/175
(58) Field of Classification Search ............. 464/175; 277/635

See application file for complete search history.

(56) References Cited

U.S. PATENT DOCUMENTS

| | | | | |
|---|---|---|---|---|
| 5,026,323 A | * | 6/1991 | Fukumura et al. | 464/175 |
| 5,599,029 A | * | 2/1997 | Umeno | 277/636 |
| 7,357,725 B2 | * | 4/2008 | Sueoka et al. | 464/175 |
| 2002/0034983 A1 | * | 3/2002 | Saito et al. | 464/175 |

FOREIGN PATENT DOCUMENTS

| | | | | |
|---|---|---|---|---|
| EP | 0 157 301 A1 | * | 10/1985 | ............... 464/175 |
| GB | 962455 | * | 5/1962 | ............... 464/175 |
| JP | A-4-300463 | | 10/1992 | |
| JP | A-06-094046 | | 4/1994 | |
| JP | A-11-153226 | | 6/1999 | |
| JP | A-2002-295509 | | 10/2002 | |

OTHER PUBLICATIONS

Office Action dated Sep. 12, 2008 in corresponding Chinese patent application No. 200710089521.9 (and English translation).

* cited by examiner

*Primary Examiner*—Greg Binda
(74) *Attorney, Agent, or Firm*—Posz Law Group, PLC (57) ABSTRACT

A boot for constant-velocity universal joint includes a major-diameter fastener, a minor-diameter fastener, and a bellows. The bellows includes a first root, a first crest, a second root, a second crest, a third root, a third crest, a fourth root, a fourth crest, a fifth root and a fifth crest. The first crest, the second crest, the third crest, the fourth crest and the fifth crest have a top, respectively, and the tops of the second crest, third crest and fourth crest are disposed on an outer peripheral side with respect to a line L1, which the tops of the first crest and fifth crest make there between, in a cross section involving the central axis of the bellows.

4 Claims, 5 Drawing Sheets

BOOT FOR CONSTANT-VELOCITY UNIVERSAL JOINT

BACKGROUND OF THE INVENTION

1. Field of the Invention

The present invention relates to a boot, which covers constant-velocity universal joints, an indispensable component part for the joint of drive shaft for front-wheel-drive vehicle, to inhibit water and dust from coming in the joint element of constant-velocity universal joint.

2. Description of the Related Art

The joint element of constant-velocity universal joint is covered with a bellows-shaped boot in which grease is sealed. The boot inhibits water and dust from coming in the joint element to enable a constant-velocity universal joint to rotate smoothly with large angles. A boot for constant-velocity universal joint comprises a major-diameter fastener, a minor-diameter fastener, and a substantially truncated cone-shaped bellows. The major-diameter fastener is fitted around the major-diameter retainer of cup, a mating member. The minor-diameter fastener has a minor diameter, which is smaller than that of the major-diameter fastener, and is fitted around the minor-diameter retainer of shaft, another mating member. The bellows connects the major-diameter fastener with the minor-diameter fastener integrally. When the boot is put in service, the bellows deforms in compliance with the changing angle, which the major-diameter fastener and minor-diameter faster make. As a result, even when a constant-velocity universal joint rotates with a large angle, the boot can cover the joint element of the constant-velocity universal joint securely.

In order to make conventional boots for constant-velocity universal joint be likely to follow the changing angle, which the central axis of cup and the central axis of shaft make, and in order to make the stress, which occurs in their bellows, small, conventional boots therefor are formed so that the crests of the bellows have a large diameter comparatively. However, it has been required recently to reduce the weight of vehicle. As the size of vehicle body is made more compact, it has been required as well to make the configuration of boots for constant-velocity universal joint more compact. When a boot for constant-velocity universal joint is made more compact, it is possible not only to reduce the weight of boot per se, but also to reduce the amount of grease, which is held inside boot. Therefore, a compacted boot contributes to the weight reduction of automobile greatly.

On the assumption that the overall length of boot for constant-velocity universal joint is kept constant, it is needed and is indispensable to diminish the outside diameter of bellows in order to make a boot for constant-velocity universal joint more compact. When diminishing the outside diameter of bellows, the membrane length of the crests is shortened accordingly. Hence, in order to keep the displacement magnitude and arising stress equivalent to those exhibited by conventional boot for constant-velocity universal joint, it is necessary to make the depth of the roots of bellows greater.

However, simply making the depth of the roots of bellows greater might result in such a drawback that, when the central axis of cup and the central axis of shaft make a large angle, the roots of bellows, which are disposed adjacent to the major-diameter fastener, are bit between the cup and shaft. When the roots are thus bit, a larger force acts onto the roots. If the drawback occurs repetitively, the damaged roots impair the sealing ability of boot. Accordingly, it is inevitable to replace boots frequently. Consequently, a problem arises that the thus compacted boot has a shortened longevity.

In connection therewith, Japanese Unexamined Patent Publication (KOKAI) Gazette No. 4-300,463 discloses a boot whose bellows comprises six or more crests and 5 or more roots. Moreover, the bottoms of 3 or more roots, which are disposed on the major-diameter fastener side, make a line, which forms a major-diameter root pattern; and the bottoms of 2 or more roots, which are disposed on the minor-diameter fastener side, make a line, which forms a minor-diameter root pattern. In this conventional boot, the bellows bends so as to follow the two patterns, the major-diameter root pattern and minor-diameter root pattern. Accordingly, the conventional boot produces good bendability especially at the central portion, the boundary between the two patterns. Moreover, the patent publication sets forth that the conventional boot does not undergo any unreasonable deformation and/or distortion in the circumstances of high-speed rotation so that it is good in terms of the durability.

Moreover, Japanese Unexamined Patent Publication (KOKAI) Gazette No. 2002-295, 509 proposes a boot for constant-velocity universal joint, boot which comprises a straight section disposed between the crest, disposed closest to the minor-diameter fastener, and the minor-diameter fastener. This conventional boot makes it possible to reduce the number of crests, which are disposed on the side of minor-diameter fastener and which exhibit less displacement magnitude, by one. Therefore, it is possible to reduce the weight of boot without adversely affecting the durability of boot.

In addition, from the viewpoint of the readiness of mold making and the man-hour requirements of molding, it is desirable to mold the bellows of boot for constant-velocity universal joint by blow molding. However, in the case of making the overall length of boot constant, it becomes difficult to blow molding such a boot because the pitches between the crests and the roots narrow down when the number of the crests and roots increases. On the other hand, when the number of the crests and roots is less, the resulting boot has exhibited lowered degree of deformation freedom in service.

Hence, the "preliminary compression" has been carried out conventionally. That is, the overall length of boot is formed longer than the assembly length by increasing the number of the crests and roots; and the resulting boot is assembled with a constant-velocity universal joint while being compressed. Thus, it is possible to secure the membrane lengths in bellows sufficiently. Accordingly, the resultant boot can secure the durability with ease. However, when the difference between the dimension upon molding and the dimension upon assembling enlarges, the load required for preliminary compression has enlarged excessively to deteriorate the assembly workability.

In particular, an in-board side boot for constant-velocity universal joint is exposed to a higher temperature than an out-board side boot for constant-velocity universal joint is. Moreover, an in-board side boot expands and contracts in the axial direction more frequently than an out-board side boot does, because the minor-diameter retainer moves in the axial direction relatively with respect to the major-diameter retainer. It is for these reasons that an in-board side boot is required to satisfy furthermore sufficient durability.

SUMMARY OF THE INVENTION

The present invention has been developed in view of the aforementioned circumstances. It is therefore an object of the present invention to make the assemblability and downsizing of resinous boot compatible with the durability thereof without sacrificing the former.

A boot for constant-velocity universal joint according to the present invention solves the aforementioned problems. The boot includes the following: a major-diameter fastener to be fitted around a major-diameter retainer; a minor-diameter fastener disposed separately away from the major-diameter fastener and coaxially therewith, having a minor diameter, which is smaller than that of the major-diameter fastener, and to be fitted around a minor-diameter retainer; and a bellows connecting the major-diameter fastener with the minor-diameter fastener integrally, and formed substantially as a truncated cone-shaped boot. The boot further has a dimension between the major-diameter fastener and the minor-diameter fastener. The dimension is a distance between a major-diameter side fastening position for the major-diameter retainer and a minor-diameter side fastening position for the minor-diameter retainer. The bellows includes a first root, a first crest, a second root, a second crest, a third root, a third crest, a fourth root, a fourth crest, a fifth root and a fifth crest, which are disposed in this order in the direction away from the major-diameter fastener to the minor-diameter fastener, and the first crest, the second crest, the third crest, the fourth crest and the fifth crest have a top, respectively, the tops of the second crest, third crest and fourth crest are disposed on an outer peripheral side with respect to a line L1 which the tops of the first crest and fifth crest make there between, in a cross section involving the central axis of the bellows; and the bellows reduces diametrically from large to small in the direction away from the first crest to the fifth crest sequentially.

Moreover, in the present boot for a constant-velocity universal joint, the first root, the second root, the third root, the fourth root and the fifth root of the bellows preferably have a bottom, respectively. The bellows preferably includes the second root and third root whose bottoms are disposed on an inner peripheral side with respect to a line L2, which the bottoms of the first root and fifth root make there between, in a cross section involving the central axis of the bellows. The bellows preferably decreases diametrically from large to small in the direction away from the first root to the fifth root sequentially. In addition, the bellows preferably includes the fourth root whose bottom is disposed on an outer peripheral side with respect to the line L2 in a cross section involving the central axis of the bellows.

Another boot for constant-velocity universal joint according to the present invention also solves the aforementioned problems, and includes the following: a major-diameter fastener to be fitted around a major-diameter retainer; a minor-diameter fastener disposed separately away from the major-diameter fastener and coaxially therewith, having a minor diameter, which is smaller than that of the major-diameter fastener, and to be fitted around a minor-diameter retainer; and a bellows connecting the major-diameter fastener with the minor-diameter fastener integrally. The bellows is formed substantially in a truncated shape. The boot further has a dimension between the major-diameter fastener and the minor-diameter fastener. The dimension is a distance between a major-diameter side fastening position for the major-diameter retainer and a minor-diameter side fastening position for the minor-diameter retainer. The boot is formed of a thermoplastic polyester elastomer. The thermoplastic polyester elastomer includes the following: a polyester block copolymer; and an epoxy compound exhibiting bifunctionality or more in an amount of from 0.01 to 10 parts by weight with respect to the polyester block copolymer taken as 100 parts by weight.

The present boot for a constant-velocity universal joint can be assembled without carrying out the preliminary compression and accordingly reduces the man-hour requirements for assembling sharply, because the dimension between the major-diameter fastener and the minor-diameter fastener equals the dimension between a major-diameter side fastening position for the major-diameter retainer and a minor-diameter side fastening position for the minor-diameter retainer. Moreover, when the present boot is assembled with a constant-velocity universal joint, the present boot is not compressed at all. Accordingly, the present boot exhibits a large displacement magnitude with respect to a compression load, and shows high bendability as well. Consequently, even when the present boot is used on the in-board side of constant-velocity universal joint where the minor-diameter retainer moves in the axial direction relatively with respect to the major-diameter retainer, the present boot demonstrates high durability sufficiently.

Moreover, in the present boot, since the fifth crest of the bellows has a smaller outside diameter than those of the second, third and fourth crests thereof, the bellows exhibits enhanced rigidity. Moreover, since the second, third and fourth crests of the bellows have a larger diameter, respectively, they can be provided with a sufficient membrane length securely. These advantageous actions improve the expanding/contracting ability and bendability of the bellows, and thereby enhance the durability the present boot.

In addition, in the present boot according to a first preferable embodiment, since the second and third roots of the bellows protrude inside more than the first and fifth roots thereof do. That is, the inside diameter of the first root can be made larger sufficiently. Accordingly, it is possible to inhibit the first root of the bellows from being bitten in service. Moreover, the second and third roots of the bellows can be provided with a more prolonged membrane length, respectively. Consequently, the present boot exhibits furthermore enhanced durability.

Moreover, in the present boot according to a second preferable embodiment, the fourth root of the bellows has an enlarged inside diameter. Accordingly, it is possible to reduce the contact-surface pressures between the membranes of the bellows upon compressing the bellows. In other words, it is possible to inhibit the contact-surface pressures from increasing more than necessary. Consequently, it is possible to furthermore upgrade the durability of the present boot.

In addition, another boot for constant-velocity universal joint according to the present invention can be assembled with mating members, a cup and a shaft, without carrying out the preliminary compression. Accordingly, another present boot can reduce the assembly man-hour requirements sharply. Moreover, since another present boot is hardly compressed when it is assembled, it exhibits a large displacement magnitude with respect to a compression load, and shows high bendability as well. Consequently, even when another present boot is used on the in-board side of constant-velocity universal joint where the minor-diameter retainer moves in the axial direction relatively with respect to the major-diameter retainer, another present boot can demonstrate high durability sufficiently. In addition, the specific thermoplastic polyester elastomer used in another present boot furthermore upgrades the durability of another present boot.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A boot 3 for a constant-velocity universal joint according to the present invention includes a major-diameter fastener 1, a minor-diameter fastener 2, and a bellows 3. The major-diameter fastener 1 is to be fitted around a major-diameter retainer 100. The minor-diameter fastener 2 is disposed separately away from the major-diameter fastener 1 and coaxially therewith, and has a minor diameter D2, which is smaller than a major diameter D1 of the major-diameter fastener 1, and is to be fitted around a minor-diameter retainer 200. The bellows connects the major-diameter fastener 1 with the minor-diameter fastener 2 integrally, and is formed as a truncated cone shape substantially.

Moreover, the bellows 3 includes a first root (a), a first crest (A), a second root (b), a second crest (B), a third root (c), a third crest (C), a fourth root (d), a fourth crest (D), a fifth root (e) and a fifth crest (E). The first root (a) and crest (A), the second root (b) and crest (B), the third root (c) and crest (C), the fourth root (d) and crest (D), and the fifth root (e) and crest (E) are disposed in this order in the direction away from the major-diameter fastener to the minor-diameter fastener. In addition, the first crest (A), the second crest (B), the third crest (C), the fourth crest (D) and the fifth crest (E) have a top, respectively, and the tops of the second crest (B), third crest (C) and fourth crest (D) are disposed on an outer peripheral side with respect to a line "L1," which the tops of the first crest (A) and fifth crest (E) make there between, in a cross section involving the central axis X of the bellows 3. Moreover, the bellows 3 is reduced diametrically from large to small in the direction away from the first crest (A) to the fifth crest (E) sequentially.

Specifically, the bellows comprises the fifth crest (E), the outside diameter of which is smaller than those of the second (B), third (C) and fourth (D) crests, and it exhibits enhanced rigidity. Moreover, since the bellows 3 includes the second (B), third (C) and fourth (D) crests, the outside diameters of which are larger, it can be provided with sufficient membrane lengths securely. According to these advantages, the bellows 3 exhibits improved expanding/contracting ability and bendability. Thus, the present boot shows enhanced durability.

Note that the second crest (B), the third crest (C) and the fourth crest (D) can preferably have an outside radius Br, Cr, Dr, which is larger than a radial dimension L1B, L1C, L1D between the central axis X of the bellows 3 and the line L1 by a factor of from 105 to 120%, respectively, in a cross-section, which is made by cutting with an imaginary plane involving the central axis X of the bellows 3. When the factor is less than 105%, the bellows 3 exhibits lowered durability. When the factor is more than 120%, it is difficult to make the bellows 3 more compact and make it more lightweight.

The first root (a), the second root (b), the third root (c), the fourth root (d), and the fifth root (e) have bottoms, respectively. Note that the bellows 3 can preferably include the second root and third root whose bottoms (b), (c) are disposed on an inner peripheral side with respect to a line L2, which the bottoms of the first root (a) and fifth root (e) make there between, in a cross section involving the central axis X of the bellows 3. Moreover, the bellows 3 can preferably be reduced in size diametrically from large to small in the direction away from the first root (a) to the fifth root e sequentially. The thus constructed bellows 3 can have a sufficiently enlarged inside diameter at the first root a. Accordingly, the first root (a) of the bellows 3 can be inhibited from being bitten in service. Moreover, the bellows 3 can earn a more prolonged membrane length at the second and third roots (b), (c), respectively. Consequently, the bellows 3 provides furthermore enhanced durability for the present boot.

In the thus constructed preferable bellows 3, the second root (b) and the third root (c) can preferably have an inside radius br, cr, which is smaller than a radial dimension L2b, L2c between the central axis X of the bellows 3 and the line L2 by a factor of from 80 to 95%, respectively, in a cross-section, which is made by cutting with an imaginary plane involving the central axis X of the bellows. When the factor is more than 95%, the bellows 3 exhibits lowered durability. When the factor is less than 80%, the bellows 3 might possibly interfere with the minor-diameter retainer 200, such as a shaft of constant-velocity universal joint.

Figure 2:
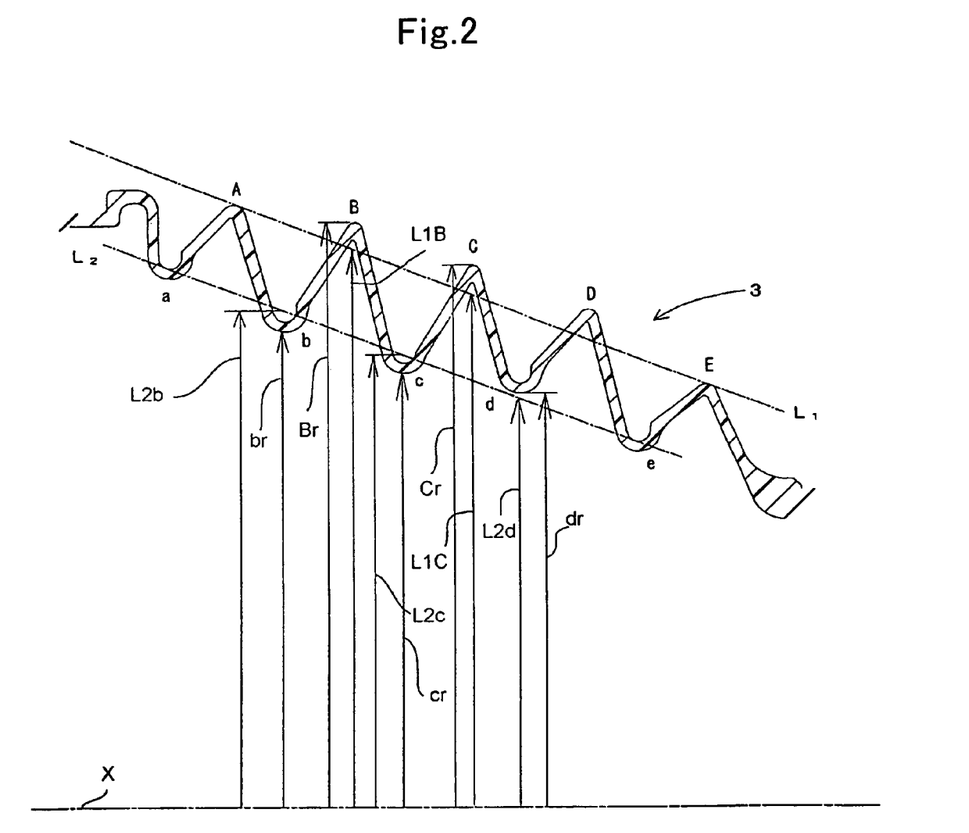
FIG. 2 is an enlarged axial cross-sectional view for illustrating a major portion of the boot according to Example No. 1.

Moreover, the bellows 3 can further preferably comprise the fourth root (d), the bottom of which is disposed on an outer peripheral side with respect to the line L2, as indicated by the radial dimensions dr, which indicates the inside radius of the fourth root (d), or the distance from the axis X to the bottom of the fourth root (d), and the radial dimension L2d, which indicates the radial distance from the axis X to the line L2 at the root (d), in FIG. 2. In the thus constructed preferable bellows 3, only the fourth root (d) is offset from the first, second, third and fifth roots (a), (b), (c), (e). Accordingly, upon being compressed, the relationship between the third crest (C) and the fourth crest (D) differs from the relationships between the first crest (A) and the second crest (B), between the second crest (B) and third crest (C), between the fourth crest (D) and fifth crest (E). Consequently, the preferable bellows 3 can inhibit the contact-surface pressures, which act between the membranes of the first, second, third, fourth and fifth crests (A), (B), (C), (D), (E) of the bellows 3. As a result, the preferable bellows 3 gives the present boot furthermore upgraded durability.

Note that the tops of crests (A), (B), (C), (D), (E) and the bottoms of roots (a), (b), (c), (d), (e) set forth in the present specification refer to the tops and bottoms in the wavy outer peripheral surface of the bellows 3.

Also note that the above-described present boot exhibits a dimension D3 between the major-diameter fastener 1 and the minor-diameter fastener 2, which equals a dimension between a major-diameter side fastening position for the major-diameter retainer 100 and a minor-diameter side fastening position for the minor-diameter retainer 200. Specifically, the present boot shows satisfactory durability by simply fitting the major-diameter fastener 1 and minor-diameter fastener 2 around the major-diameter retainer 100 and minor-diameter retainer 200, respectively, without ever expanding and/or contracting the bellows 3. That is, it is possible to assemble the present boot with mating members, a cup and a shaft, without ever carrying out the preliminary compression. Accordingly, it is possible to sharply reduce the assembly man-hour requirements for the present boot. Moreover, the assembled present boot is hardly compressed. Consequently, the present boot exhibits a large displacement magnitude with respect to a compression load, and shows high bendability as well. Thus, the present boot can demonstrate high durability sufficiently even when it is used on the in-board side of constant-velocity universal joint where the minor-diameter retainer 200 moves in the axial direction relatively with respect to the major-diameter retainer 100.

In addition, the present boot can preferably be formed of a thermoplastic polyester elastomer, which comprises a polyester block copolymer and an epoxy compound exhibiting bifunctionality or more in an amount of from 0.01 to 10 parts by weight with respect to the polyester block copolymer taken as 100 parts by weight. As for such a thermoplastic polyester elastomer, it is possible to use those disclosed in Japanese Unexamined Patent Publication (KOKAI) Gazette No. 11-153,226.

EXAMPLES

Hereinafter, the present invention will be described in more detail with reference to examples and a comparative example.

Example No. 1

Figure 1:
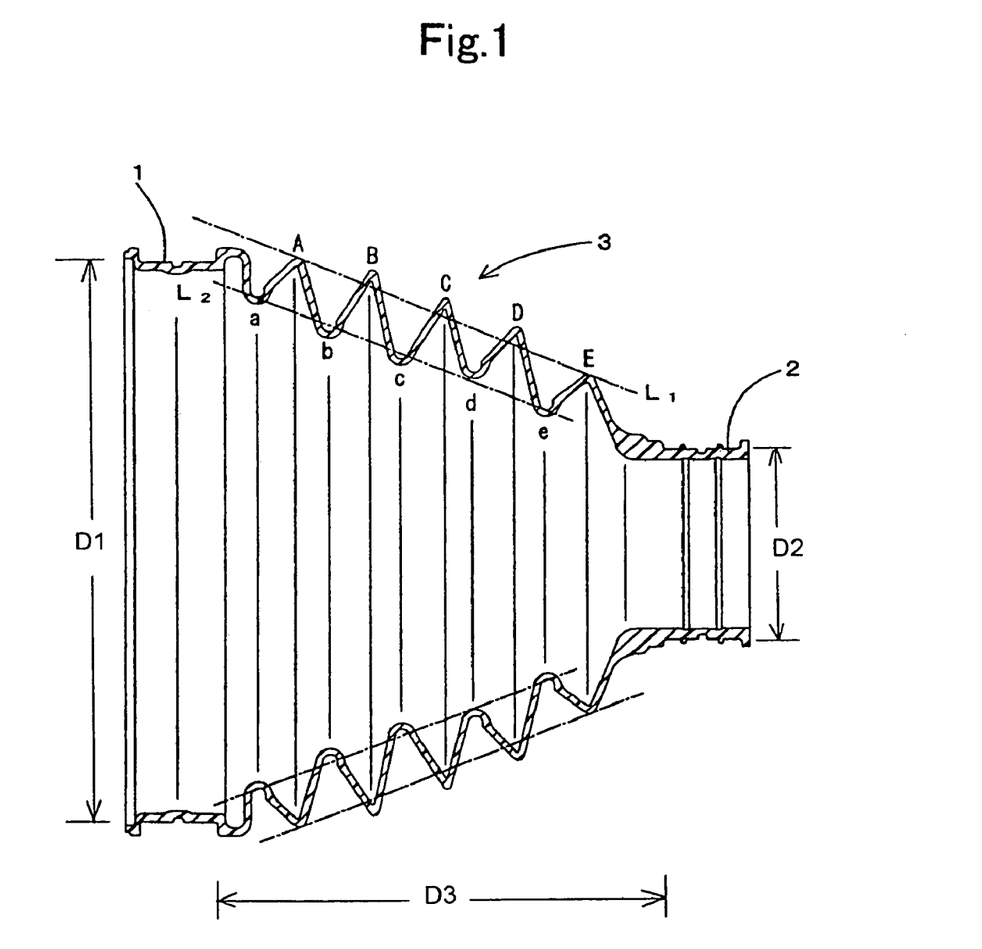
FIG. 1 is an axial cross-sectional view of a boot for constant-velocity universal joint according to Example No. 1 of the present invention.

FIG. 1 is an axial cross-sectional view of a boot for constant-velocity universal joint according to Example No. 1 of the present invention. FIG. 2 is an enlarged axial cross-sectional view for illustrating a major part of the boot according to Example No. 1. This boot is intended for an application on the in-board side of constant-velocity universal joint. The boot comprises a major-diameter fastener 1, a minor-diameter fastener 2, and a bellows 3. The major-diameter fastener 1 is to be fitted around a mating member, a cup of constant-velocity universal joint, and is formed as a cylindrical shape. The minor-diameter fastener 2 is disposed separately away from the major-diameter fastener 1 and coaxially therewith, is to be fitted around the other mating member, a shaft of constant-velocity universal joint, and is formed as a cylindrical shape. The bellows 3 connects the major-diameter fastener 1 with the minor-diameter fastener 2 integrally, and is formed as a truncated cone shape substantially.

The major-diameter fastener 1 and bellows 3 are formed of a thermoplastic polyester elastomer (i) by blow molding. For example, the used thermoplastic polyester elastomer (i) is heat-resistant grade "HYTREL" produced by TORAY-DUPONT Co., Ltd., one of the thermoplastic polyester elastomers disclosed in Japanese Unexamined Patent Publication (KOKAI) Gazette No. 11-153,226. On the other hand, the minor-diameter fastener 2 is formed of the same thermoplastic polyester elastomer (i) by injection molding integrally with the bellows 3.

The bellows 3 comprises a first root (a), a first crest (A), a second root (b), a second crest (B), a third root (c), a third crest (c), a fourth root (d), a fourth crest (D), a fifth root (e), and a fifth crest (E). The first root (a), the first crest (A), the second root (b), the second crest (B), the third root (c), the third crest (C), the fourth root (d), the fourth crest (D), the fifth root (e), and the fifth crest (E) are disposed in this order in the direction away from the major-diameter fastener 1 to the minor-diameter fastener 2. The ridge line of the crests (A) through (E) and the bottom line of the roots (a) through (e) are formed as a perfect circle, respectively.

When cutting the bellows 3 with a plane involving the central axis thereof as illustrated in FIGS. 1 and 2, the intersecting point of the ridge line of the first crest (A) with the plane, that is, the top of the first crest (A), and the top of the fifth crest (E), which is determined likewise, make a line. As shown in the drawings, the resulting line is labeled L1. Note herein that the respective tops of the second crest (B), third crest (C) and fourth crest (D), which are determined similarly, are disposed on an outer peripheral side with respect to the line L1 as illustrated in the drawings. Moreover, the first crest (A), the second crest (B), the third crest (C), the fourth crest (D), and the fifth crest (E) are reduced diametrically from large to small in the direction away from the first crest (A) to fifth crest (E) sequentially.

In addition, the intersecting point of the inner-periphery ridge line of the first root (a) with the plane, that is, the bottom of the first root (a), and the bottom of the fifth root (e), which is determined likewise, make a line. As shown in FIGS. 1 and 2, the resulting line is labeled L2. Note herein that the respective bottoms of the second root (b) and third root (c), which are determined similarly, are disposed on an inner peripheral side with respect to the line "L2" as illustrated in the drawings. However, the bottom of the fourth root (d) is disposed on an outer peripheral side with respect to the line L2 as illustrated in the drawings. Moreover, the first root (a), the second root (b), the third root (c), the fourth root (d), and the fifth root (e) are reduced diametrically from large to small in the direction away from the first root (a) to fifth root (e) sequentially.

To summarize, the membrane, which connects between the fifth root (e) and the fifth crest (E), has a shorter length than those of the membranes, which connect the respective roots (a), (b), (c) and (d) with the respective crests (A), (B), (C) and (D). Accordingly, the bellows 3 exhibits higher rigidity on the side of the minor-diameter fastener 2. On the contrary, the membranes, which connect between the first crest (A) and the second root (b), between the second root (b) and the second crest (B), between the second crest (B) and the third root (c), between the third root (c) and the third crest (C), and between the fourth crest (D) and the fifth root (e), have a longer length, respectively. Consequently, the bellows 3 can show satisfactory high expanding/contracting ability and bendability securely on the side of the major-diameter fastener 1.

Moreover, the membranes, which connect the third crest (C) with the fourth root (d) and the fourth root (d) with the fourth crest (D), have a shorter length, respectively. Accordingly, when the bellows 3 is compressed, the third crest (C) and the fourth crest (D) are put in a different compressed relationship from compressed relationships which the first crest (A) and the second crest (B), the second crest (B) and third crest (C), the fourth crest (D) and fifth crest (E) are put in, respectively. Consequently, the bellows 3 can inhibit the contact-surface pressures, which are exerted between the membranes of the first crest (A), second crest (B), third crest (C), fourth crest (D) and fifth crests (E), from increasing.

In addition, the depth of the first root (a) is made shallow. Therefore, when the shaft and cap make a large angle, the first root (a) is inhibited from being bitten between the shaft and cap.

Figure 3:
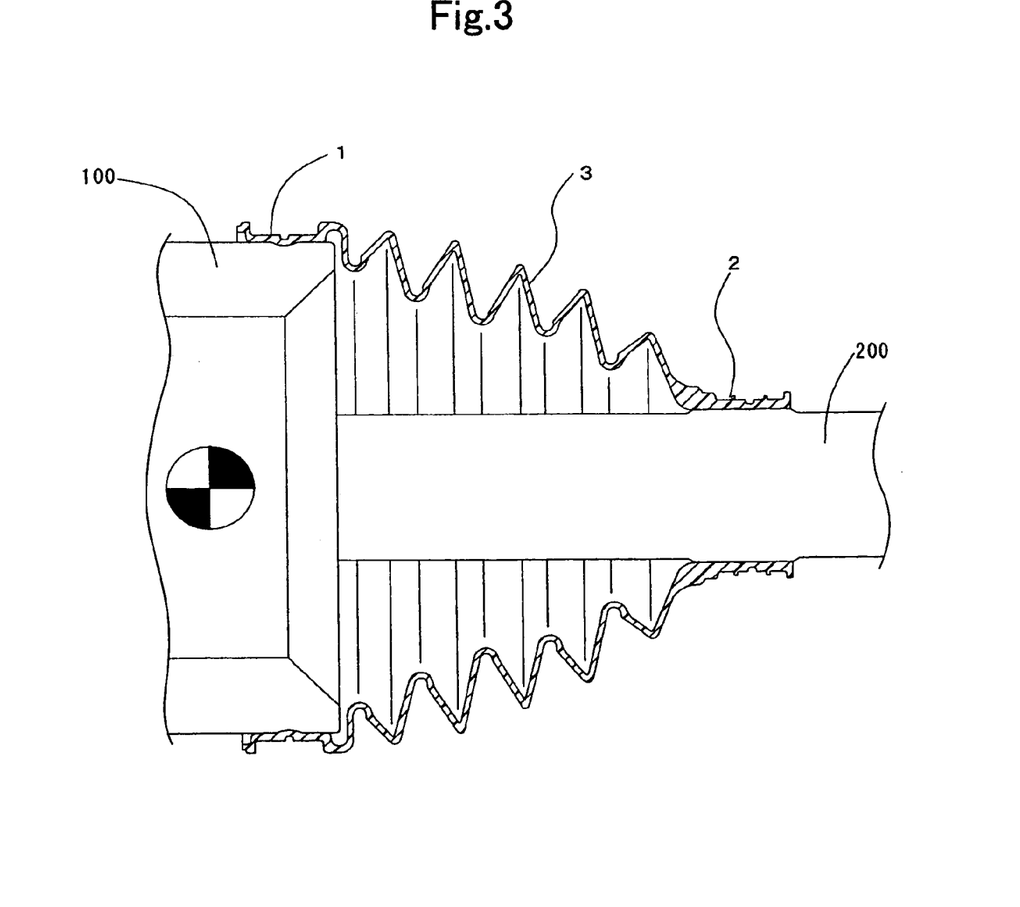
FIG. 3 is an axial cross-sectional view for illustrating the boot for constant-velocity universal joint according to Example No. 1 when it is assembled with mating members.

Moreover, the boot according to Example No. 1 of the present invention is formed of the thermoplastic polyester elastomer (i), one of the thermoplastic polyester elastomers disclosed in Japanese Unexamined Patent Publication (KOKAI) Gazette No. 11-153,226. By means of the synergistic effect of the properties of thermoplastic polyester elastomer (i) and the above-described configurational advantages, the boot according to Example No. 1 exhibits improved durability. Therefore, even when being fastened to a cup 100, or the major diameter retainer, and a shaft 200, or the minor diameter retainer, as illustrated in FIG. 3 without being subjected to the preliminary compression, the boot according to Example No. 1 can demonstrate satisfactory durability.

Conventional Example

Figure 4:
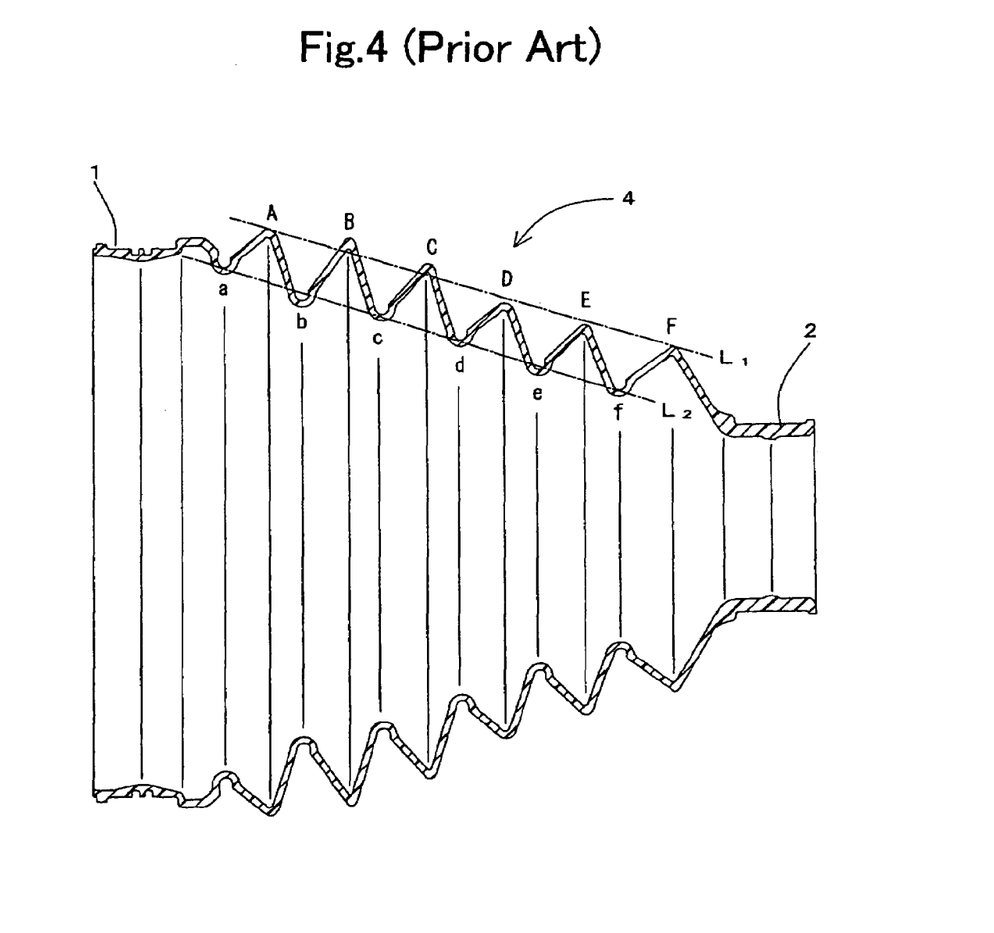
FIG. 4 is an axial cross-sectional view of a boot for constant-velocity universal joint according to Comparative Example.

FIG. 4 is an axial cross-sectional view of a conventional boot for constant-velocity universal joint. Note that parts, which function in the same manner as those of the boot according to Example No. 1 of the present invention, will be described while designating them with the same reference symbols as those of FIGS. 1 and 2. This conventional boot comprises a major-diameter fastener 1, a minor-diameter fastener 2, and a bellows 4. The major-diameter fastener 1 and bellows 4 are formed of a thermoplastic polyester elastomer (ii) by blow molding. For example, the used thermoplastic polyester elastomer (ii) is general grade "HYTREL" produced by TORAY-DUPONT Co., Ltd. On the other hand, the minor-diameter fastener 2 is formed of the same thermoplastic polyester elastomer (ii) by injection molding integrally with the bellows 4.

The bellows 4 comprises a first root (a), a first crest (A), a second root (b), a second crest (B), a third root (c), a third crest (c), a fourth root (d), a fourth crest (D), a fifth root (e), a fifth crest (E), a sixth root (f), and a sixth crest (F). The first root (a), the first crest (A), the second root (b), the second crest (B), the third root (c), the third crest (C), the fourth root (d), the fourth crest (D), the fifth root (e), the fifth crest (E), the sixth root (f), and the sixth crest (F) are disposed in this order in the direction away from the major-diameter fastener 1 to the minor-diameter fastener 2. The ridge line of the crests (A) through (F) and the bottom line of the roots (a) through (f) are formed as a perfect circle, respectively.

When cutting the bellows 4 with a plane involving the central axis thereof as illustrated in FIG. 4, the top of the first crest (A) and the top of the sixth crest (F) make a line. As shown in the drawing, the resulting line is labeled L1. The respective tops of the second crest (B) and third crest (C) are disposed on an outer peripheral side with respect to the line L1; but the respective tops of the fourth crest (D) and fifth crest (E) are disposed on an inner peripheral side with respect to the line L1 as illustrated in the drawing. Moreover, the first crest (A), the second crest (B), the third crest (C), the fourth crest (D), the fifth crest (E), and the sixth crest (F) are reduced diametrically from large to small in the direction away from the first crest (A) to sixth crest (F) sequentially.

In addition, the bottom of the first root (a) and the bottom of the sixth root (f) make a line. As shown in FIG. 4, the resulting line is labeled L2. The respective bottoms of the second root (b) and fifth root (e) are disposed on an inner peripheral side with respect to the line L2 as illustrated in the drawing. However, the respective bottoms of the third root (c) and fourth root (d) are positioned on the line L2 as illustrated in the drawing. Moreover, the first root (a), the second root (b), the third root (c), the fourth root (d), the fifth root (e), and the sixth root (f) are reduced diametrically from large to small in the direction away from the first root (a) to sixth root (f) sequentially.

Figure 5:
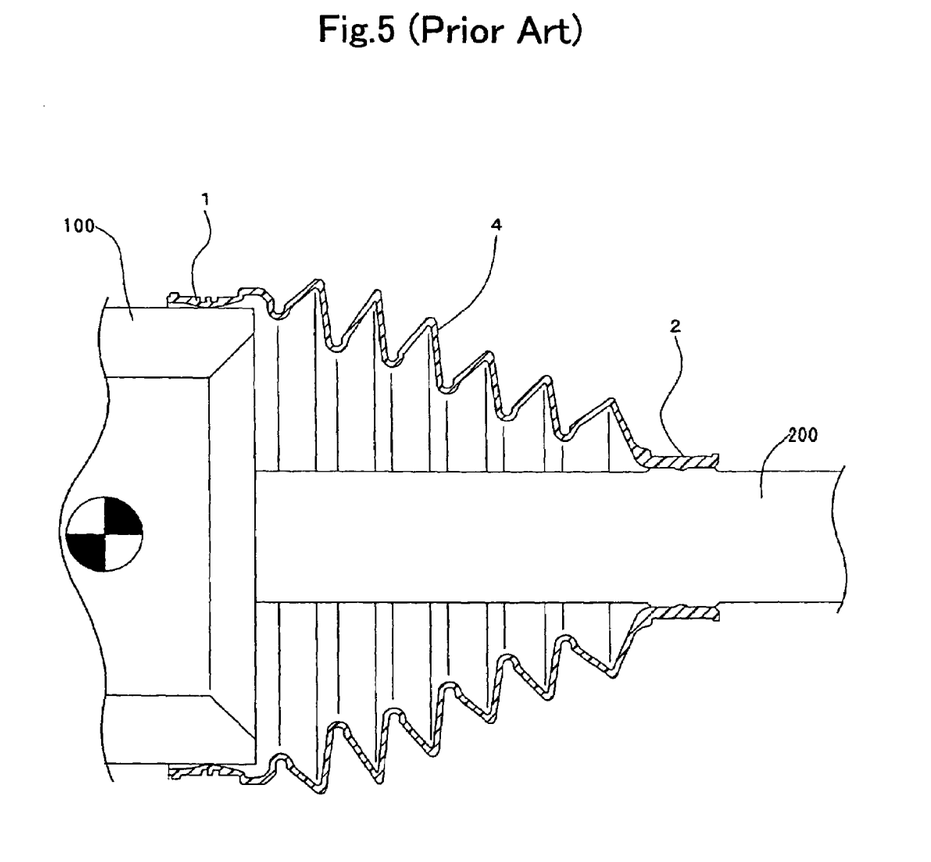
FIG. 5 is an enlarged axial cross-sectional view for illustrating the boot according to Comparative Example No. 1 when it is assembled with mating members.

As illustrated in FIG. 5, the conventional boot is used in such a manner that it is compressed preliminarily in the axial direction by a factor of 86% with respect the post-molding free length and is then fastened around a cup 100 and a shaft 200. Specifically, the conventional boot comprises the bellows 4 whose crest and roots are increased more by one, respectively, than those of the bellows 3 of the boot according to Example No. 1. The conventional boot is assembled with the cup 100 and shaft 200 after compressing the bellows 4 in the axial direction preliminarily. Accordingly, the conventional boot is advantageous for securing the membrane lengths in the bellows 4 sufficiently. Consequently, the conventional boot can show durability securely. However, the conventional boot enlarges the load for the preliminary compression excessively, and thereby has deteriorated the assembly workability.

Comparative Example

The above-described conventional boot was manufactured with dimensions upon fastening, and was used without subjecting it to the preliminary compression. The thus constructed conventional boot was labeled Comparative Example.

Example No. 2

A boot, which was constructed in the same manner as the boot according to Comparative Example, was formed of the same thermoplastic polyester elastomer (i) as used in the boot according to Example No. 1, and was used without subjecting it to the preliminary compression. The resultant boot was labeled Example No. 2.

(Test and Evaluation)

The above-described boots were fastened around the cup 100 and shaft 200. A grease was sealed inside the respective boots. Then, the shaft 200 was slid by 10 mm in the direction of compressing the boots. Under such a circumstance, the cup 100 was rotated under the following conditions. The angle made by the cup 100 and shaft 200 was 20 degrees. The ambient temperature was 130° C. The revolving speed of the cup 100 was 600 rpm. In this instance, the time until the boots' bellows was broken was measured, respectively. Table 1 below sets forth the results as the boots' longevity.

TABLE 1

| | Number of Crests | Preliminary Compression | Molding Material | Longevity |
| --- | --- | --- | --- | --- |
| Ex. No. 1 | 5 | None | (i) | 550 hours |
| Conventional Ex. | 6 | Done | (ii) | 480 hours |
| Comp. Ex. | 6 | None | (ii) | 280 hours |
| Ex. No. 2 | 6 | None | (i) | 600 hours |

From Table 1, it follows that the boot according to Conventional Example exhibited remarkably improved durability more than the boot according to Comparative Example did. Thus, it is apparent that making a boot with a longer dimension than the fastened dimension and compressing it preliminarily are effective for improving the durability. However, note that the boot according to Example No. 2 showed more upgraded durability than the boot according to Conventional Example did, even though it is not subjected to the preliminary compression in the same manner as the boot according to Comparative Example. That is, a boot, which is formed of the thermoplastic polyester elastomer (i), can make the preliminary compression obsolete, and can demonstrate enhanced durability securely.

However, in the boot according to Example No. 2, since the bellows 4 comprises a larger number of crests and roots, the boot according to Example No. 2 might make it difficult to form the bellows 4 by blow molding.

Hence, in the boot according to Example No. 1, the bellows 3 comprises the crests and roots less by one than those of the bellows 4 of the boot according to Conventional Example or Example No. 2, respectively. Therefore, the membrane lengths in the bellows 3 are shorter than those in the bellows 4. Regardless of such a construction, the boot according to Example No. 1 exhibited higher durability than the boot according to Conventional Example and Comparative Example did. It is apparent that the advantage resulted from the following arrangements. That is, the tops of the second crest (B), third crest (C) and fourth crest (D) of the bellows 3 are disposed on an outer peripheral side with respect to the line "L1," which the first crest (A) and fifth crest (E) thereof make there between, in a cross section involving the central axis of the bellows 3; and the bellows 3 reduces diametrically from large to small in the direction away from the first crest (A) to the fifth crest (E) sequentially.

Having now fully described the present invention, it will be apparent to one of ordinary skill in the art that many changes and modifications can be made thereto without departing from the spirit or scope of the present invention as set forth herein including the appended claims.

What is claimed is:

1. A boot for constant-velocity universal joint, the boot comprising:
   a major-diameter fastener to be fitted around a major-diameter retainer;
   a minor-diameter fastener disposed separately away from the major-diameter fastener and coaxially therewith, having a minor diameter, which is smaller than that of the major-diameter fastener, and to be fitted around a minor-diameter retainer; and
   a bellows connecting the major-diameter fastener with the minor-diameter fastener integrally, and formed as a truncated cone shape substantially;
   the boot further exhibiting a dimension between the major-diameter fastener and the minor-diameter fastener, wherein the dimension is a distance between a major-diameter side fastening position for the major-diameter retainer and a minor-diameter side fastening position for the minor-diameter retainer;
   wherein:
   the bellows comprises a first root, a first crest, a second root, a second crest, a third root, a third crest, a fourth root, a fourth crest, a fifth root and a fifth crest, which are disposed in this order in the direction away from the major-diameter fastener to the minor-diameter fastener, and the first crest, the second crest, the third crest, the fourth crest and the fifth crest have a top, respectively, the tops of the second crest, third crest and fourth crest are disposed on an outer peripheral side with respect to a first line (L1), which is defined by the tops of the first crest and fifth crest, in a cross section involving the central axis of the bellows;
   the bellows is reduced in size diametrically from large to small in the direction away from the first crest to the fifth crest sequentially;
   the first root, the second root, the third root, the fourth root and the fifth root of the bellows have a bottom, respectively;
   the bellows comprises the second root and third root whose bottoms are disposed on an inner peripheral side with respect to a second line (L2), which is defined by the bottoms of the first root and fifth root, in a cross section involving the central axis of the bellows;
   the bellows is reduced in size diametrically from large to small in the direction away from the first root to the fifth root sequentially; and
   the bellows comprises the fourth root whose bottom is disposed on an outer peripheral side with respect to the second line (L2) in a cross section involving the central axis of the bellows.

2. The boot set forth in claim 1, wherein the second crest, the third crest and the fourth crest have an outside radius, which is larger than a radial dimension between the central axis of the bellows and the first line (L1) by a factor of from 105 to 120%, respectively.

3. The boot set forth in claim 1, wherein the second root and the third root have an inside radius, which is smaller than a radial dimension between the central axis of the bellows and the second line (L2) by a factor of from 80 to 95%.

4. The boot set forth in claim 1 being formed of a thermoplastic polyester elastomer, the thermoplastic polyester elastomer comprising:
   a polyester block copolymer; and
   an epoxy compound exhibiting bi functionality or more in an amount of from 0.01 to 10 parts by weight with respect to the polyester block copolymer taken as 100 parts by weight.

* * * * *